United States Patent [19]
Lascar et al.

[11] Patent Number: 4,896,816
[45] Date of Patent: Jan. 30, 1990

[54] METHOD FOR PRODUCING A FLUIDTIGHT AND HEAT CURABLE SEAL BETWEEN METAL OBJECTS AND A BODY OF VITROCERAMIC MATERIAL

[75] Inventors: Guy Lascar, Vigneux sur Seine; Jean-Jacques Roland, Sceaux, both of France

[73] Assignees: Quantel S.A., Les Ulis Orsay Cedex; Societe Francaise d'Equipements Pour la Navigation Arienne-S.F.E.N.A., Velizy Villacoublay Cedex, both of France

[21] Appl. No.: 119,253

[22] Filed: Nov. 6, 1987

Related U.S. Application Data

[63] Continuation of Ser. No. 702,031, Feb. 15, 1985, abandoned.

[30] Foreign Application Priority Data

Feb. 15, 1984 [FR] France .................................. 84 02302

[51] Int. Cl.⁴ .................... B23K 20/00; C21D 1/00; H01J 9/00
[52] U.S. Cl. ................................ 228/122; 228/124; 228/265; 228/193; 228/234; 228/243; 228/246; 228/263.12; 228/263.17; 228/56.3; 445/28; 445/44; 148/127
[58] Field of Search ............. 228/205, 231, 246, 265, 228/193, 194, 121, 122, 124, 115, 263.12, 188, 234, 243, 56.3, 263.17; 445/44, 28; 148/127

[56] References Cited

U.S. PATENT DOCUMENTS

| | | | |
|---|---|---|---|
| 3,458,923 | 8/1969 | Hoffman | 228/56.3 |
| 3,513,535 | 5/1970 | Clarke | 228/188 |
| 3,752,554 | 8/1973 | Thatcher | 445/28 |
| 3,956,821 | 5/1976 | Martin | 228/263.12 |
| 4,050,956 | 9/1977 | de Bruin et al. | 228/193 |
| 4,273,282 | 6/1981 | Norvell et al. | 228/116 |
| 4,407,658 | 10/1983 | Bernot | 445/44 |
| 4,595,377 | 6/1986 | Norvell | 445/28 |

FOREIGN PATENT DOCUMENTS

| | | | |
|---|---|---|---|
| 2556279 | 12/1977 | Fed. Rep. of Germany . | |
| 2183213 | 12/1973 | France . | |
| 1482696 | 8/1977 | United Kingdom | 228/122 |

OTHER PUBLICATIONS

"A Guide to Preform Soldering" Alloys Unlimited, Inc., Long Island City, N.Y., phone ST6-4480, 1959.
Chemical Abstracts, vol. 97, No. 12, Sep. 1982, p. 307, resume 97008x, Columbus, Ohio (U.S.), M. B. Nicholas et al.: "The Fabrication of Steel–Alumina Joints by Diffusion Bonding".

Primary Examiner—Richard K. Seidel
Assistant Examiner—Samuel M. Heinrich
Attorney, Agent, or Firm—Wenderoth, Lind & Ponack

[57] ABSTRACT

A process for producing a fluidtight seal between a body of a vitroceramic material and a metal element intended to be part of the construction of a gas laser and in particular a laser gyrometer includes interposing between the surfaces of the body of vitroceramic material and the metal element to be sealed a joining member of a metal capable of diffusing into the vitroceramic material, and subjecting the assembly thus formed to a thermo-compression operation so as to result in a superficial diffusion of the material of the joining member into the facing surfaces of the body of vitroceramic material and the metal element.

6 Claims, 1 Drawing Sheet

METHOD FOR PRODUCING A FLUIDTIGHT AND HEAT CURABLE SEAL BETWEEN METAL OBJECTS AND A BODY OF VITROCERAMIC MATERIAL

This application is a continuation, of now abandoned application Ser. No. 702,031, filed Feb. 15, 1985.

BACKGROUND OF THE INVENTION

The present invention relates to a fluidtight seal which is capable of being heat cured between metal objects and a body of vitroceramic material and more particularly to such a method for producing gas lasers, in particular laser gyrometers.

Laser gyrometers are ring lasers whose structure is defined by a block of a vitroceramic material having a very low coefficient of thermal expansion, for example on the market under the name "Zerodur".

The three or four mirrors forming the ring resonant cavity and the metal electrodes (a cathode, two anodes), are fixed on the machined block of vitroceramic material.

The mirrors, whose substrate is also of a vitroceramic material, are usually fixed to the block by molecular adhesion which is a direct connection between two optical, perfectly polished, planar and clean surfaces put into intimate contact with each other.

The electrodes are used for establishing a continuous electric discharge in the gas composed of a mixture of helium and neon, which acts as an amplifier medium for creating the laser effect (emission of neon at 0.633 $\mu$m).

The cathode is usually a member of aluminum having a suitable emitting surface and the anodes are for example formed by tungsten rods, although other metallic materials may be used for either type of electrode.

The seals between the metal electrodes and the vitroceramic block of laser gyrometers must satisfy various very severe specifications, mainly for ensuring the durability of the laser gyrometers under precise conditions of use:

fluidtightness with respect to vacuum and helium at $10^{-11}$ atm.cm$^3$.s$^{-1}$ under the normal conditions of temperature and pressure;

absence of pollution of the block when sealing;

limited sealing temperature so as to avoid impairing the properties of the vitroceramic material, thereby ensuring the integrity of the machined block (for example a temperature of <700° C.);

possibility of subsequently reheating the seal to 200° C. at least during a laser conditioning stage (thermal degassing under a vacuum for ensuring the durability of the laser);

lifetime of depending on the applications, more than ten years storage or more than ten thousand hours of operation;

performance in thermal environments of typically between −50° C. and +100° C.;

performance under mechanical and vibratory conditions.

The vitroceramic-metal seals for the electrodes must satisfy various requirements of operation and overall size of the electrodes and economical conditions of manufacture.

Many embodiments are possible. The metal-vitroceramic seal may be effected directly on the electrode or on an auxiliary metal member acting as a case or support for the electrode proper. In this case, such auxiliary member is chosen for its material and geometry to facilitate sealing in accordance with the chosen technique.

The fixing of the metal electrodes has led to the development of techniques for achieving sealing between the metal and vitroceramic.

Most of the methods for achieving a fluidtight seal for gas lasers are based on the use of a seal joint or joining member formed of gold and indium.

U.S. Pat. No. 3,277,281 discloses a method for sealing mirrors or electrodes to a stable laser body of a material having a low coefficient of expansion.

The surfaces to be sealed receive a coating of gold before being put into intimate contact with each other. The seal is produced when the material of a ring of indium, placed outside and heated to its melting temperature, progressively migrates by capillary action between the two surfaces and forms an alloy of Au-In which constitutes a thin sealing joint ($\leq 5$ $\mu$m).

This type of method does not always satisfy the aforementioned fluidtight conditions.

French Pat. No. 2 473 035 discloses for an application to laser gyrometers a method for achieving a seal between a block of vitroceramic and metal electrodes which comprises:

a deposit of gold on the metal member, then the application of a relatively thick blank of indium heated to 175° C. under a vacuum so as to form an alloy Au-In at the interface;

a cleaning of this treated metal surface and of the polished useful surface of the vitroceramic block, this cleaning being carried out under a vacuum by an ionic bombardment or exposure to an ultraviolet radiation;

pressing between the two surfaces which are thus cleaned and devoid of any impurities so as to achieve a seal.

Further, French Pat. No. 2 502 722 discloses another method for obtaining a seal between a block of vitroceramic and metal electrodes for producing laser gyrometers.

This method comprises the following operations:

deposit of a gold coating on the elements of vitroceramic and metal, which are carefully machined;

application of a toric joining member of pure indium between the two surfaces, and then compression in the cold state so as to form a sealing joint having a thickness of about 0.1 mm, this joint being fluidtight at this stage ($5.10^{-11}$ atm.cm$^3$.s$^{-1}$);

heating to 140° C. for 12 hours of the assembly thus produced so as to promote diffusion of the indium into the gold.

These various methods and generally the methods involving the formation of a sealing joint which is fusible at low temperature, for example based on indium and indium alloys, have at least two drawbacks.

They require the deposit of a gold coating on the bodies to be sealed, or at least on one thereof, and do not permit a reheating of the sealed assembly to a sufficient temperature, whereas it is desirable to be able to heat to at least 200° C. under vacuum the laser or the gyrometer laser when it is conditioned, so as to remove impurities by degasing and to ensure over a long period the cleanliness of the gas He-Ne used as the amplifying medium. Otherwise, in order to expect to reach the required duration of life, it is necessary to employ traps or "getters" of impurities, the use of which presents drawbacks.

There is moreover another method for achieving a fluidtight seal between glass or glass and metal achieved at a higher temperature and known by the term thermocompression. This method is disclosed, for example, in the U.S. Pat. No. 2,876,596.

An aluminum joining member is brought to a temperature close to its melting point (500°–600° C.) which temperature is necessarily lower than the softening point of the bodies to be sealed. A pressure of approximately 10 MPa is then exerted between the parts to be sealed so as to produce an intense plastic deformation of the aluminum while breaking the film of oxide ($Al_2O_3$) present on the surface of the initial joint. A sealing joint of aluminum having a thickness on the order of 0.1 mm is thus formed.

French Pat. No. 2 193 794 also discloses a method for producing a fluidtight seal with the use of a jointing member of aluminum or lead or an alloy of one of these metals.

The field of application of this patent concerns assemblies between an object of metal and an object of ceramic or glass, and in particular for the production of electronic tubes under a vacuum (image reproducing tubes, filming tubes, X-ray image amplifiers).

In order to achieve fluidtightness over a long period, this patent stresses the necessity of a rapid and intense plastic deformation of the joining member, preferably within less than 2 seconds, so as to avoid the presence of an intermediate layer of oxide in the assembly formed.

SUMMARY OF THE INVENTION

An object of the invention is to provide a method for achieving a seal between a metal object and an object of a vitroceramic material, in particular for forming an ultrastable gas laser, this method avoiding the drawbacks of the aforementioned prior art methods.

The invention therefore provides a method for producing a fluidtight seal between a body of a vitroceramic material and a metal element intended to be part of the construction of a gas laser, and in particular a laser gyrometer, such method comprising interposing between the surfaces to be sealed of the body of vitroceramic and the metal element a joining member of a metal capable of being diffused in the vitroceramic material, and subjecting the assembly thus formed to a thermo-compression operation so as to cause a superficial diffusion of the material of the joining member into the facing surfaces of the body of vitroceramic and the metal element.

The method defined hereinbefore has been found to be particularly effective in the achievement of seals between bodies of Zerodur vitroceramic material and metal elements of Invar.

To the knowledge of the Applicants, these phenomena of superficial diffusion are original and justify the interest of the method of the invention.

The phenomenon of surface diffusion of aluminum into the vitroceramic material (Zerodur) has been revealed by micro-analyses of the interfaces. This mechanism of diffusion is created by the gradient of chemical potential produced by an oxydo-reducing reaction at the aluminum-aluminosilicate interfaces (phenomena of surfaces similar to those given by Wagner's theory).

The diffusion of the aluminum into the vitroceramic (Zerodur) appears to be related to the chemical and crystalline nature of the vitroceramic (78% of quartzic crystalline phase $\beta$ +22% of amorphous phase).

The diffusion of the aluminum into the vitroceramic (Zerodur) is facilitated by certain parameters of thermocompression (temperature of connection, time during which the pressure is maintained for deforming the aluminum joining member at the connecting temperature, presence of a reducing atmosphere at the interface of the aluminum joining member.

It is important to note that this phenomenon of diffusion has not been revealed for connections achieved by thermo-compression of a metal joining member between vitreous materials of the glass-glass or silica-silica type. Further, in the context of connections of electrodes on an optical block of laser gyrometers, none of the known methods ensures diffusion of a connecting joining member into a substrate of vitroceramic.

The known methods provide:

either a connection of the gold-indium type, in which indium diffuses into a gold coating previously deposited on the connection interfaces;

or a low-temperature connection (indium);

or a thermo-compression between vitrous materials without maintaining the pressure for deforming the joining member at the connecting temperature during a long time period.

Further, the presence of a phenomenon of diffusion of aluminum into the vitroceramic (Zerodur) allows deviations from the parameters and procedures with respect to certain other applications of thermo-compression.

The characteristics of the connections obtained and particularly the mechanical behaviour and the evolution of fluidtighness after heat curing may be correlated with the parameters of diffusion (temperature, period during which the pressure for deforming the joining member joint at the connecting temperature is maintained).

The connections may be heat cured again at a temperature very close to the connecting temperature without altering the quality of the fluidtightness of the connections ($\leq 10^{-10}$ atm.cm$^3$.s$^{-1}$ after thermal treatments carried out at 450° C. under a vacuum of (1.333 $10^{-4}$ Pa) for 24 hours).

The phenomenon of diffusion of the aluminum into the vitroceramic (Zerodur) will orient the choice of the parameters of thermo-compression.

Tests carried out on connections achieved with parameters facilitating the diffusion of the aluminum into the vitroceramic (Zerodur) have shown that the method for connecting electrodes of laser gyrometers on an optical block by thermo-compression was capable of satisfying the aforementioned specifications and more particularly:

fluidtightness as concerns vacuum and helium on the order of $10^{-11}$ atm.cm$^3$.s$^{-1}$;

good performance with respect to thermal cycles up to 200° C., whence the notion of a fluidtight seal which is capable of being heat cured at relatively high temperature.

BRIEF DESCRIPTION OF THE DRAWINGS

A better understanding of the invention will be had from the following description of the carrying out of the method of the invention with reference to the accompanying drawings which are given by way of example and in which.

DETAILED DESCRIPTION OF THE INVENTION

Figure 1:
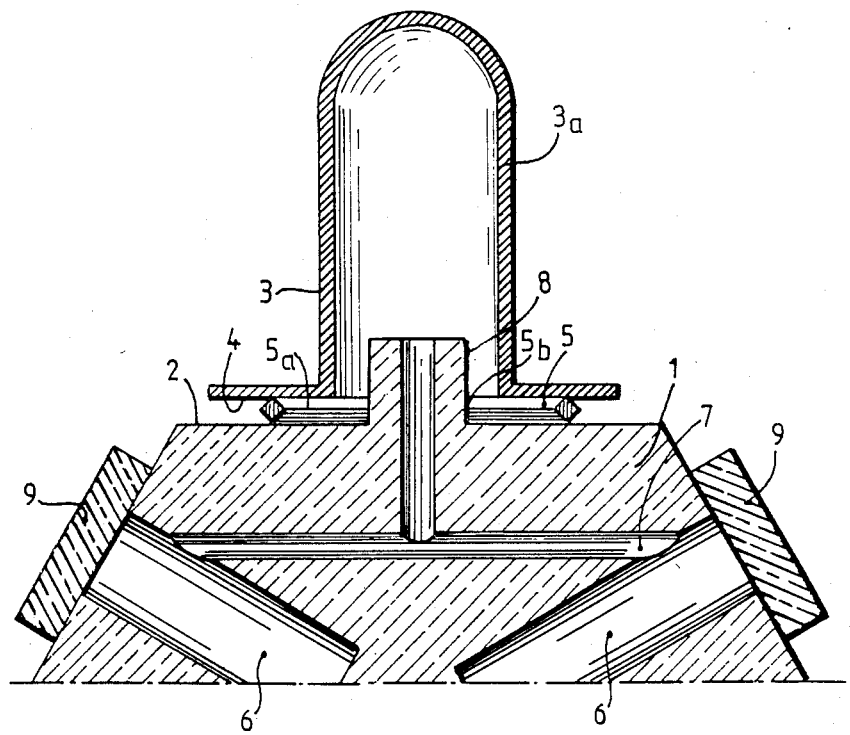
FIG. 1 is an elevational and sectional view of a connection between a cathode and an optical block of a laser gyrometer achieved in accordance with the invention.

A single-piece body 1 of vitroceramic material constituting an optical block of a laser is machined so as to obtain in sealing zones for electrodes polished surfaces 2 which are devoid of micro-cracks and roughly planar (planar to within a few μm).

The block 1 is subjected to a conventional cleaning for optical parts before use.

A metal element 3 to be sealed to the block is preferably composed of a material having a low coefficient of expansion (iron-nickel alloys such as Invar or iron-nickel-cobalt alloys such as Kovar or Dilver P).

This element, which may be the support of an electrode proper, has a planar solid or annular surface 4 which will be a connecting surface.

In the embodiment of FIG. 1 there is shown the arrangement of a cathode in which a cathode 3a of machined aluminum has a cylindro-spherical shape and is introduced by a cryogenic fitting.

A joining member 5 between the surface 2 of the body 1 and a surface 4 of the element 3 is preferably a member of aluminum having a purety of 99.5% or 99.9%.

The geometry of the joining member 5 of aluminum may be that of a torus obtained from a wire whose ends are chamfered and overlap so as to avoid undesirable gaps.

In the embodiment shown in FIG. 1, the joining member 5 is machined or stamped in the form of a single circular closed element whose cross-sectional shape is a square or other polygon so as to facilitate shaping as a wrought metal. Generally, the joining member is designed in such manner as to obtain a self-centering of the metal element. For this purpose, the joining member includes a thin centering membrane 5a which is integral therewith and which has a central orifice 5b through which is passed the foot of the cathode.

Member 5 also may be made with outer centering tabs obtained by a cutting out of the aforementioned membrane and an outward folding therefore.

Member 5 advantageously is made in such manner that its cross-section has a diagonal perpendicular to the connection surfaces 2 and 4.

After machining, the joining member undergoes a degreasing operation in accordance with the conventional ranges of surface treatments, a thermal recrystallization treatment and a pickling or scouring treatment before use. This preparation of the joining member is desirable in order to ensure an optimum diffusion at the interfaces of the vitroceramic/aluminum and (iron-nickel)/aluminum connections.

The body 1 is provided with cavities 6 forming gas wells connected by capillary passages 7 to the foot of the cathode 8 and opening into the cathode "3A". Mirrors 9 are fixed on the oblique surfaces of the body 1 facing the gas wells 6.

The connecting phase proper comprises the following steps.

(a) The positioning of the elements 1, 3 and 5 to be sealed in mechanically adequate centered conditions.

(b) Heating of the elements to a temperature which may vary from 400° C. to 550° C. either in a homogenous manner or in a manner to reach the desired temperature at least in the region of the joining member 5 and the connection surfaces 2 and 4.

(c) Application for a few seconds of a force for deforming the joining member which results in a rapid hot plastic deformation of the aluminum (speed of deformation of the joining member equals $10^{-4}$ m.s$^{-1}$). The deformation stress of the joining member may vary between 20 and 60 MPa depending on the initial geometry thereof and the connection temperature.

(d) Maintenance of the deforming force on the joining member at the connection temperature for a period of from 20 to 40 min, preferably 30 min.

(e) Slow cooling after withdrawal of the force for deforming the aluminum joining member (return to the ambient temperature within a few hours).

The connection at the aluminium/metal alloy interface with the electrode is achieved also by diffusion of the aluminum of the joining member into the alloy of the electrode. This preparation of the surface facilitates diffusion at the connection interface.

In the course of this stage of connection, the elements are placed in a surrounding atmosphere which avoids oxidation of the connection interfaces, particularly the electrode support interface (Fe-Ni). This atmosphere may be a nitrogen-hydrogen 90-10 reducing atmosphere or a primary vacuum.

The connection parameters such as temperature, time during which the joining member deforming force is maintained and atmosphere surrounding the connection surfaces affect the formation of the superficial diffusion layer of the aluminum at the connection interfaces (vitroceramic, iron-nickel or iron-nickel-cobalt).

Tests have shown that the connection temperature and the maintenance of the deforming force at this temperature influence the depth of the diffusion of the aluminum into the vitroceramic and the alloy (iron-nickel or iron-nickel-cobalt).

The obtainment of fluidtight connections which are reproducible at a level of fluidtightness of $\leq 10^{-11}$ atm.cm$^3$.s$^{-1}$ for connection temperatures ranging up to 400°-450° C. is facilitated by the phenomenon of superficial diffusion at the connection interfaces which consolidates the adherence of the joining member.

Subsequently, the assembly of the elements thus sealed is subjected to a heat treatment for relieving the stresses produced in the connection plane by the differential expansion of the two sealed bodies 1 and 3, these having mean coefficients of expansion which are very different from each other since the vitroceramic remains practically without dimensional modification at 550° C.

A deformed annular joint is obtained whose width is 2 to 3 mm and whose thickness is 0.1 to 0.15 mm.

The described procedure may be different inasmuch as the phenomenon of diffusion observed increases the quality of adhesion of the joining member. Tests on connections obtained by thermo-compression without a thermal diffusion step with maintenance of the force of deformation of the joining member but with a thermal diffusion treatment carried out at the connection temperature under a vacuum of a few 1.333 $10^{-4}$ Pa for several hours, show that it is possible to obtain connections between the vitroceramic and the iron-nickel or iron-nickel-cobalt alloy with an joining member. In this case, the depth of diffusion is greater (20 μm≃) in the metal electrode carrier 3 (iron-nickel-cobalt or iron-nickel) than in the vitroceramic of the body 1 ($\simeq 1 \mu m$).

Under conventional conditions of the procedure mentioned before, the depth of diffusion in the vitroceramic (Zerodur) and in the iron-nickel or iron-nickel-cobalt alloy is a few microns ($\simeq 1$ to $4 \mu m$).

Figure 2:
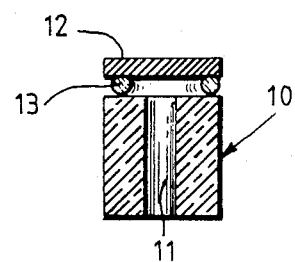
FIG. 2 is an elevational and sectional view of an anode assembly connection achieved in accordance with the invention.

In FIG. 2, the invention is considered to be applied to the production of a seal between a support 10 of vitroceramic material provided with a capillary passage II and a metal anode pellet 12.

Here, the joining member 13 employed is a toric joint of aluminum.

The conditions of production of this seal are similar to those mentioned with reference to the joining member shown in FIG. 1.

Evolutions of the shape of the joining member 5 may be envisaged, whereby such member also may be a sheet.

Metals other than aluminum for producing the connection joint may also be employed.

These materials may be:
zinc and zinc alloys of the ZAMAK 5 type (i.e. containing aluminum, copper and magnesium)
lead-tin, lead-tin-silver alloys.

What is claimed is:

1. A method for producing a fluidtight seal between a body of vitroceramic material formed of an amorphous phase and a quartzic crystalline phase $\beta$ and a metal element intended to form part of the construction of a gas laser, and in particular a laser gyrometer, said method comprising the steps of:

interposing between surfaces to be sealed of said body of said vitroceramic material formed of an amorphous phase and a quartzic crystalline phase $\beta$ and said metal element an annular joining member of aluminum capable of diffusing into said vitroceramic material; and subjecting the assembly thus formed to a thermocompression operation comprising a preliminary step of heating the assembly to a temperature required to provide diffusion at the interface between said vitroceramic material and said aluminum annular joining member, said preliminary heating step being followed by a step of compression of the assembly in order to provide a plastic deformation of the joining member, so as to cause a superficial diffusion of the aluminum material of said annular joining member into the facing surfaces of said body of vitroceramic material and said metal element.

2. A method according to claim 1, wherein said joining member is made from a single closed annular element having a polygonal cross-sectional shape and including an integral centering membrane having therein a central orifice.

3. A method according to claim 1, comprising placing in position the elements to be sealed under adequate mechanical centering conditions, heating said elements to a temperature of 400° C. to 490° C., in such a manner that said temperature is reached at least in the region of said joining member and of the connection surfaces of said elements, applying during a few seconds a joint-deforming force so as to ensure a rapid, hot, and plastic deformation of the aluminum material of said joining member, maintaining said joint-deforming force at said temperature and, after withdrawal of said joint-deforming force, allowing the assembly to cool slowly so as to return to the ambient temperature in several hours.

4. A method according to claim 1, comprising subjecting said joining member, subsequent to production thereof, to a recrystallization heat treatment process and a scouring process before use.

5. A method according to claim 1, wherein the sealed assembly of elements is subjected to a heat treatment for ensuring a relaxation of the stresses produced in the connection plane by differential expansion of the sealed elements.

6. A method according to claim 1, wherein said compression step is conducted at a pressure of 20 to 60 MPa.

* * * * *